United States Patent [19]
Nishiyama et al.

[11] Patent Number: 5,731,074
[45] Date of Patent: Mar. 24, 1998

[54] POROUS FILM AND METHOD OF PRODUCING THE SAME

[75] Inventors: Soji Nishiyama; Hiroyuki Higuchi; Kiichiro Matsushita; Yutaka Kishii; Ryoichi Matsushima, all of Osaka, Japan

[73] Assignee: Nitto Denko Corporation, Osaka, Japan

[21] Appl. No.: 784,522

[22] Filed: Jan. 17, 1997

Related U.S. Application Data

[63] Continuation of Ser. No. 604,241, Feb. 21, 1996, abandoned.

[30] Foreign Application Priority Data

Mar. 15, 1995 [JP] Japan .................................. 7-055550

[51] Int. Cl.$^6$ .................................. B32B 27/32; H01H 2/16
[52] U.S. Cl. .................. 428/315.9; 428/137; 428/316.6; 428/315.7; 429/145; 429/254; 264/41; 264/154; 264/235.6
[58] Field of Search .................................. 428/137, 316.6, 428/315.7, 315.9; 429/145, 254; 264/41, 154, 235.6

[56] References Cited

U.S. PATENT DOCUMENTS

| | | | |
|---|---|---|---|
| 4,650,730 | 3/1987 | Lundquist et al. | 429/62 |
| 4,731,304 | 3/1988 | Lundquist et al. | 429/62 |
| 5,240,655 | 8/1993 | Troffkin et al. | 264/28 |
| 5,385,777 | 1/1995 | Higuchi et al. | 428/316.6 |
| 5,480,745 | 1/1996 | Nishiyama et al. | 429/242 |

FOREIGN PATENT DOCUMENTS

| | | |
|---|---|---|
| 0668156 | 8/1995 | European Pat. Off. |
| 0682376 | 11/1995 | European Pat. Off. |
| 2-77108 | 3/1990 | Japan |
| 4-181651 | 6/1992 | Japan |
| 4-38101 | 6/1992 | Japan |
| 5-251070 | 9/1993 | Japan |
| 6-20671 | 1/1994 | Japan |

*Primary Examiner*—Kathleen L. Choi
*Attorney, Agent, or Firm*—Sughrue, Mion, Zinn, Macpeak & Seas, PLLC

[57] ABSTRACT

A porous film of a laminate structure, comprising a porous inner layer comprising polyethylene as the essential component, and having formed on both surfaces thereof a porous outer layer comprising polypropylene and having a Vickers hardness of 10 or more. The porous film is suitable as a separator for a lithium battery, and when the porous film is superposed with a positive electrode and a negative electrode, the film is difficult to be scratched and perforated at the assembly of cells. A production method of the porous film is also provided.

13 Claims, No Drawings

POROUS FILM AND METHOD OF PRODUCING THE SAME

This is a Continuation of Application Ser. No. 08/604, 241 filed Feb. 21, 1996, now abandoned.

FIELD OF THE INVENTION

The present invention relates to a laminated porous film useful as a separator for a battery, etc., and a method of producing the same.

BACKGROUND OF THE INVENTION

Various types of batteries are practically used and in each of these batteries, for preventing the occurrence of short-circuiting between a positive electrode and a negative electrode, a separator is interposed between both electrodes.

Recently, as a battery applicable with the employment of cordless-electric systems in electronic instruments, etc., a lithium battery has come into the limelight from high energy density, high electromotive force, and less self-discharging.

As a lithium battery, a battery is known wherein a negative electrode is formed by a material having an ability of adsorbing Or occluding a lithium ion, e.g., lithium, an alloy of lithium and other metal such as aluminum, carbon, graphite, etc., or a conductive polymer doped with a lithium ion, etc., and a positive electrode is formed by fluorinated graphite generally represented by $(CF_x)_n$, a metal oxide such as $CoLiO_2$, $MnO_2$, $V_2O_5$, $CuO$, $Ag_2CrO_4$, $TiO_2$, etc., or a sulfide such as $CuS$, etc.

In the lithium battery, since lithium as the negative electrode-forming material has a strong reactivity and a non-aqueous electrolytic solution formed by dissolving an electrolyte such as $LiPF_6$, $LiCF_3SO_3$, $LiClO_4$, $LiBF_4$, etc., in an organic solvent such as ethylene carbonate, propylene carbonate, acetonitrile, γ-butyrolactone, 1,2-dimethoxyethane, tetrahydrofuran, etc., is used, when an abnormal electric current passes by an external short-circuit, an erroneous connection, etc., there is the possibility that a temperature increases unexpectedly with the passage of the abnormal electric current.

For avoiding the occurrence of such a possibility, it is proposed to use a laminated microporous sheet comprising at least one of a first microporous sheet made of a polyolefin which is converted into a substantially nonporous sheet while substantially keeping the previously determined length and width at a temperature of from about 80° C. to 150° C. and at least one of a second microporous sheet made of a polyolefin which substantially keeps the previously determined length and width at a temperature at least 10° C. higher than the above temperature and keeps the microporous structure, as a separator as described in JP-B-4-38101 (the tern "JP-B" as used herein means an "examined published Japanese patent application") and JP-A-5-251070 (the term "JP-A" as used herein means an "unexamined published Japanese patent application").

It is also proposed to prepare a separator by laminating similarly a porous film made of a polyethylene and a porous film made of a polypropylene as described in JP-A-6-20671.

The intention of using such a porous sheet as the separator is in that at a normal state, the occurrence of the short-circuit between both electrodes is prevented and also the electric resistance is restrained low by the porous structure to keep the battery voltage, and on the other hand, when the inside temperature of the battery is increased by an abnormal electric current, the porous sheet melts at a definite temperature and is converted into a substantially nonporous structure, whereby the electric resistance increases to intercept the battery reaction and the excessive increase of the temperature is prevented to ensure the safety.

When the inside temperature of a battery is increased by an abnormal electric current, the function of preventing the excessive increase of temperature by shutting off the current by the increase of the electric resistance to ensure the safety of the battery is generally called "shut-down" (hereinafter referred to as "SD") and is an important characteristic as a separator for a lithium battery.

At present, it is recognized in a separator made of a porous sheet to be preferred to shut off the current by converting the porous separator into a nonporous structure at a definite temperature in the range of from about 80° C. to 150° C. Accordingly, this porous separator meets the requirement in this point.

As a production method of a lithium battery using a porous sheet as the separator, a method of superposing a belt-form positive electrode, a separator, and a belt-form negative electrode, winding the superposed assembly into a roll-form, inserting the roll-form member in a metal cylinder (can), having the closed bottom, injecting an electrolytic solution in the cylinder, and then closing the opposite side of the cylinder is known.

As described above, since the electrodes of the lithium battery are made of a metal or are made by processing hard particles, the electrodes themselves are hard. Accordingly, when the superposed assembly of the separator and the positive and negative electrodes is wound in a roll-form or when the roll-form assembly is inserted into the metal cylinder, there is the possibility that the separator is scratched or perforated by the contact with the hard electrodes. Further, the scratches and the perforations have the possibility of causing an internal short-circuit of the battery.

In the separator having the first microporous sheet as an essential element which converts into a substantially nonporous sheet at a temperature of from about 80° C. to 150° C. described above as conventional separator, it is preferred that the first microporous sheet is disposed on the surface of the separator. Since it is necessary that the first microporous sheet is converted into a substantially nonporous structure at a temperature of from about 80° C. to 150° C., the microporous sheet is formed by a low-melting resin such as polyethylene. However, a low-melting resin such as polyethylene does not have a sufficient strength. Accordingly, when superposing the separator with positive and negative electrodes and winding the assembly in a roll-form or when inserting the roll-form assembly into a metal cylinder, there is the a possibility that the separator is scratched or perforated.

Also, in the separator comprising the laminate of the porous film made of polyethylene and the porous film made of polypropylene as described above, the porous film made of polyethylene has the same problem as described above.

SUMMARY OF THE INVENTION

Accordingly, one object of the present invention is to provide a porous separator which is difficult to be scratched or perforated under the above-described circumstance at assembling batteries.

Another object of the present invention is to provide a method of producing the porous separator.

As a result of various investigations to overcome the problems involved in conventional technology, it has been found that the above objects can be attained by forming a porous layer made of a polypropylene having specific properties on both surfaces of a porous layer made of a polyethylene. The present invention has been completed based on this finding.

The porous film according to the present invention comprises a porous inner layer comprising a polyethylene, and having formed on both surfaces thereof a porous layer comprising a polypropylene and having a Vickers hardness of 10 or more.

The method of producing a porous film according to the present invention comprises forming a laminate film having an inner layer comprising a polyethylene as the essential component, and having formed on both surfaces thereof an outer layer comprising a polypropylene layer, stretching the laminate film to make porous the inner layer and the outer layers, and then heat-treating the porous laminate film to increase the Vickers hardness of the outer layers to 10 or more.

DETAILED DESCRIPTION OF THE INVENTION

The present invention is described in detail below.

The inner layer in the porous film of the present invention comprises a polyethylene as the essential component. In the present invention, the term "as the essential component" means that the synthetic resin which forms the porous inner layer may be a polyethylene alone or may be a mixture of the polyethylene and at least one kind of other thermoplastic synthetic resins such as propylene, poly-4-methylpentene, polyacetal, polyester, polyamide, etc.

When the porous inner layer is formed by a mixture of polyethylene and other thermoplastic synthetic resin, from the point of the balance between the SD initiation temperature and the initial electric resistance it is preferred that the proportion of polyethylene in the total weight of polyethylene and other synthetic resin is from 30 to 80% by weight.

In addition, in forming the porous inner layer by the mixture of polyethylene and other thermoplastic synthetic resin, it is preferred from the point of the chemical stability that a polypropylene is selected from the other synthetic resins and the inner layer is formed by the mixture of polyethylene and polypropylene. In this case, the proportion of the polyethylene in the total weight of polyethylene and polypropylene is preferably from 30 to 80% by weight as described above.

In the present invention, the porous inner layer may be formed by polyethylene alone or a mixture of polyethylene and other thermoplastic synthetic resins. Also, the inner layer may further contains appropriate amounts of additives such as antioxidants, fillers, coloring agents, antistatic agents, lubricants, compatibilizers, etc.

In the porous film of the present invention, a porous outer layer comprising polypropylene is formed on both surfaces of the porous inner layer. It is necessary that the porous outer layer has a Vickers hardness of 10 or more. By forming the porous outer layer having such a Vickers hardness, when the porous film is superposed with electrodes and they are wound in a roll form, or the roll-form assembly is further inserted into the metal cylinder, the porous film is difficult to be scratched and perforated. There is no particular restriction on the upper limit of the Vickers hardness of the porous outer layer, but considering the assembling workability of the battery, the upper limit of the Vickers hardness is preferably 20. Thus, it is preferable that the Vickers hardness of the porous outer layer is from 10 to 20. In addition, the porous outer layer can also contain appropriate amounts of additives such as antioxidants, fillers, coloring agents, antistatic agents, lubricants, etc.

The porous film of the present invention has a laminate structure comprising the porous inner layer having formed on both surfaces thereof the porous outer layer. Although there are no particular restrictions on the thickness, the porosity, and the diameter of the micropores of the porous film, usually the total thickness (the sum of the thickness of the inner layer and the thicknesses of both outer layers) is from about 10 to 100 μm, the porosity is from about 20 to 80%, preferably from 30 to 60%, and the diameter of the micropores is from about 0.02 to 2 μm, preferably from 0.03 to 0.8 μm.

The outer layer is the layer for inhibiting the occurrence of scratches and perforations, and is essentially hard. For sufficiently exhibiting the inhibiting function, it is preferable that the thickness of each outer layer is at least about 3 μm. As a matter of course, since the electric resistance increases with the increase of the thickness, considering this point it is practical that the upper limit of the thickness of each outer layer is about 40 μm.

The production method of a porous film according to the present invention is described below.

The method of producing a porous film according to the present invention comprises forming a laminate film having an inner film comprising a polyethylene as the essential component, and two outer layers each comprising a polypropylene layer, each outer layer being formed on both surfaces of the inner layer, stretching the laminate film to make the inner layer and the outer layers porous, and then heat-treating the laminate film to increase the Vickers hardness of the outer layers to 10 or more.

In this method, a laminate film having the inner layer comprising a polyethylene as the essential component and two outer layers each comprising a polypropylene layer, each outer layer being formed on both surfaces of the inner layer is first formed. The laminate film can be formed by, for example, a method of simultaneously melt extruding the inner layer-forming component and the component of forming both outer layers.

The laminate film is then stretched to make it porous. In this case, it is clarified that when the laminate film is heat-treated prior to stretching (hereinafter this heat treatment is referred to as a "first heat treatment"), the formation of micropores at stretching is accelerated. The first heat treatment can be carried out by, for example, a method of contacting the laminate film with a heated roll or metal plate, a method of heating the laminate film in air or in an inert gas, or a method of winding the laminate film in a roll form and heating the roll in a gas phase. The heat-treatment temperature is usually from about 120° to 170° C. The heat-treatment time is determined according to the heat-treatment temperature and the heat-treatment method, but is usually from about 2 seconds to 50 hours.

When a multi-stage stretching method of stretching the laminate film at low temperature, and then further stretching it in the same direction at high temperature is employed as the stretching method for making porous the laminate film before or after the first heat treatment, a porous film having a high porosity and a low electric resistance is preferably obtained.

The low-temperature stretching is usually carried out at a temperature of from −20° to 60° C., and the stretching ratio (M %) is usually from about 20 to 200%. In addition, the low-temperature stretching ratio is shown by the following equation (1), wherein $L_0$ is a length of the laminate film before low-temperature stretching, and $L_1$ is the length thereof after low-temperature stretching.

$$M=(L_1-L_0)/L_0\times 100 \tag{1}$$

On the other hand, high-temperature stretching is that the low-temperature stretched film is stretched in the same direction as in the low-temperature stretching at a temperature of from about 90° to 130° C., and its stretching ratio (N %) is usually from about 10 to 500%. The high-temperature stretching ratio is shown by the following equation (2), wherein $L_2$ is the length of after high-temperature stretching, and $L_1$ is the length after low-temperature stretching (that is, the length before high-temperature stretching).

$$N=(L_2-L_1)/L_0\times 100 \tag{2}$$

Since a stress caused at stretching remains in the porous film thus obtained, and the length of the film in the stretched direction is liable to change, the dimensional stability can be improved by heat-shrinking the length in the stretched direction after stretching. It is preferred that the heat-shrinking is carried at about the same temperature as that at the high-temperature stretching. The extent of heat-shrinking can be usually that the length after stretching is reduced from about 15 to 35%.

Also, by applying a so-called "heat-set" of heating the porous film at the high-temperature stretching temperature or higher for from about 5 seconds to 2 minutes while fixing such that the length of the porous film in the stretched direction does not change, the dimensional stability can be improved as the same as in heat-shrinking. As a matter of course, both of the heat shrinkage and the heat-set can be applied.

The porous film or the porous film having been subjected to the heat-shrinking and/or the heat-set is then heat treated (hereinafter this heat treatment is referred to as a "second heat-treatment").

The second heat treatment is carried out to increase the Vickers hardness of the porous outer layers to 10 or more. By this heat-treatment, the Vickers hardness of the porous outer layers increases from about 7 to 8 to 10 or more. The same method same as in the first heat treatment can be employed as the second treatment method. The treatment temperature is usually from about 60° to 120° C., and the treatment time is usually from about 10 hours to 500 hours.

It is not yet clarified why the Vickers hardness of the porous outer layers increases by the second heat treatment, but it is assumed to be due to increase in the crystallinity and the orientation of polypropylene which is the constituent component of the outer layers.

The porous film of the present invention can be used for not only a separator for battery but also other various uses such as a separation membrane, an air-permeable material for buildings, an air-permeable material for clothes, a temperature sensor, a shut-down means for battery, etc.

The present invention is described in more detail by the following examples, but is not limited thereto.

EXAMPLE 1

High-density polyethylene having a melt index (hereinafter referred to as "MI") of 1.3 and polypropylene having MI of 0.5 were prepared as the component for forming the inner layer and as the component for forming the outer layers, respectively. Using a T-die extruding machine (die temperature 250° C.), a three-layer structure long laminate film having a total thickness of 33 μm comprising the polyethylene inner layer having formed on both surfaces thereof the polypropylene outer layer was formed by a simultaneous melt extrusion method.

The laminate film was contacted with an iron roll the surface temperature of which was kept at 150° C., for 2 minutes to apply thereto the first heat treatment. The laminate film thus heat treated was low-temperature stretched in the longitudinal direction at 25° C. such that the stretching ratio became 60%, and then high-temperature stretched in the same direction at 105° C. such that the stretching ratio became 130% to make the laminate film porous.

The porous laminate film was heated to 105° C. for one minute to shrink 20% in the longitudinal direction, and while fixing the length in the longitudinal direction, the laminate film was further heated to 125° C. for 2 minutes to apply thereto a heat set.

The porous film was wound around a cylindrical core in a roll form, and after heating it to 100° C. for 48 hours (second heat treatment), the roll-form film was cooled to room temperature.

The total thickness of the porous film was 25 μm (thickness of the inner layer was about 7 μm and the thickness of each outer layer was about 9 μm), the porosity thereof was 40%, and the average pore diameter of the micropores was 0.06 μm.

EXAMPLE 2

A mixture of 50 parts by weight of high-density polyethylene having MI of 1.3 and 50 parts by weight of isotactic polypropylene having MI of 0.5 was prepared as a component for forming the inner layer, and isotactic polypropylene having MI of 0.5 was prepared as a component for forming the outer layers. Using a T-die extruding machine (die temperature 240° C.), a three-layer structure long laminate film (thickness 32 μm) having the inner layer comprising the mixture of polyethylene and polypropylene having formed on both surfaces thereof the polypropylene outer layer was formed by a simultaneous melt extruding method.

By following the same first heat treatment, low-temperature stretching, high-temperature stretching, heat-shrinking, heat-set, and second heat treatment as in Example 1 except that the laminate film obtained above was used, a porous film having a total thickness of 25 μm (the thickness of the inner layer was about 7 μm and the thickness of each outer layer was about 9 μm), a porosity of 45%, and an average pore diameter of the micropores of 0.05 μm was obtained.

EXAMPLE 3

By following the same procedure as in Example 2 except that a mixture of 85 parts by weight of high-density polyethylene having MI of 1.3 and 15 parts by weight of isotactic polypropylene having MI of 0.5 was used as a component for forming the inner layer, a three-layer structure porous film having the inner layer comprising the mixture of polyethylene and polypropylene having formed on both surfaces thereof the polypropylene outer layer was obtained.

EXAMPLE 4

By following the same procedure as in Example 2 except that a mixture of 78 parts by weight of high-density polyethylene having MI of 1.3 and 22 parts by weight of isotactic polypropylene having MI of 0.5 was used as a component for forming the inner layer, a three-layer structure porous film having the inner layer comprising the mixture of polyethylene and polypropylene having formed on both surfaces thereof the polypropylene outer layer was obtained.

EXAMPLE 5

By following the same procedure as in Example 2 except that a mixture of 32 parts by weight of high-density polyethylene having MI of 1.3 and 68 parts by weight of isotactic polypropylene having MI of 0.5 was used as a component for forming the inner layer, a three-layer structure porous film having the inner layer comprising the mixture of polyethylene and polypropylene having formed on both surfaces thereof the polypropylene outer layer was obtained.

EXAMPLE 6

By following the same procedure as in Example 2 except that a mixture of 25 parts by weight of high-density polyethylene having MI of 1.3 and 75 parts by weight of isotactic polypropylene having MI of 0.5 was used as a component for forming the inner layer, a three-layer structure porous film having the inner layer comprising the mixture of polyethylene and polypropylene having formed on both surfaces thereof the polypropylene outer layer was obtained.

EXAMPLE 7

By following the same procedure as in Example 2 except that the second heat treatment was carried out at 110° C. for 168 hours, a three-layer structure porous film having the inner layer comprising the mixture of polyethylene and polypropylene having formed on both surfaces thereof the polypropylene outer layer was obtained.

COMPARATIVE EXAMPLE 1

By following the same procedure as in Example 1 except that the step (second heat treatment) of heating the porous film to 100° C. for 48 hours was not carried out, a porous film having a total thickness of 25 µm (the thickness of the inner layer was about 7 µm and the thickness of each outer layer was about 9 µm), the porosity of 40%, the average pore diameter of the micropores of 0.06 µm was obtained.

COMPARATIVE EXAMPLE 2

Polypropylene having MI of 0.5 and polyethylene having MI of 1.3 were prepared as the component for forming the inner layer and as the component for forming the outer layers, respectively. Using a T-die extruding machine (die temperature 250° C.), a three-layer structure long laminate film (thickness 37 µm) having the polypropylene inner layer having formed on both surfaces the polyethylene layer was obtained.

By following the same procedure as in Example 1 except that the laminate film thus obtained was used, a porous film having a total thickness of 25 µm (the thickness of the inner layer was about 8 µm and the thickness of each outer layer was about 8 µm), the porosity of 40%, the average pore diameter of the micropores of 0.06 µm was obtained.

COMPARATIVE EXAMPLE 3

A high-density polyethylene having MI of 1.3 was extrusion molded using a T-die extruding machine at 210° C. to obtain a long film having a thickness of 15 µm. The film was heat-treated by contacting it with the surface of an iron roll having a surface temperature of 120° C., and the film was low-temperature stretched at 25° C. such that the stretching ratio became 150% in the longitudinal direction, and then high-temperature stretched at 95° C. such that the stretching ratio became 200% in the same direction to make the film porous. The porous polyethylene film was heated to 100° C. for one minute to shrink the length 20% in the longitudinal direction (stretched direction), and while fixing such that the length in the direction did not change, the film was then heated to 100° C. for one minute to apply thereto a heat-set. The heat-set porous polyethylene film had a thickness of 8 µm, the porosity of 40%, and the average pore diameter of the micropores of 0.2 µm.

On the other hand, apart from this, polypropylene having MI of 0.5 was extrusion molded using a T-die extruding machine at a die temperature of 250° C. to obtain a long film having a thickness of 22 µm. The film was heat-treated by contacting it with the surface of an iron roll having a surface temperature of 150° C. for 3 minutes, and the film was low-temperature stretched at 25° C. such that the stretching ratio became 30% in the longitudinal direction, and then was high-temperature stretched at 125° C. such that the stretching ratio became 150% in the same direction to make the film porous.

By heating the porous polypropylene film to 125° C. for one minute, the length thereof was shrunk 20% in the longitudinal direction (stretched direction), and while fixing such that the length in the direction did not change, the film was then heated to 130° C. for one minute to apply thereto a heat-set. The heat-set porous polypropylene film had a thickness of 18 µm, the porosity of 45%, the average pore diameter of the micropores of 0.05 µm.

The heat-set porous polypropylene film obtained above was superposed on one surface of the heat-set porous polyethylene film, and they were press-laminated by roll press to obtain a two-layer structure porous film having a thickness of 25 µm.

The initial electric resistance, the SD initiation temperature, the Vickers hardness of the porous outer layers (in Comparative Example 3, the outer layer at the porous polypropylene side), and the percent defective (percentage of occurrence of rejected cells in assembling cells using the porous film as the separator, viz., the number of internally short-circuited cells to the number of made cells) of the porous films obtained in the examples and the comparative examples were tested by the following methods. The results obtained are shown in the Table below.

A. Initial Electric Resistance

The initial electric resistance was measured according to JIS C 2313. A solution obtained by dissolving anhydrous lithium perchlorate as an electrolyte in a mixed liquid of propylene carbonate and 1,2-dimethoxyethane at a same volume such that the concentration of the electrolyte became 1 mole/liter was used as the electrolytic solution.

AC resistance of 1 KHz was measured with an ohmmeter (LCR Meter KC-532, manufactured by Kokuyou Denki Kogyo K.K.), and electric resistance R ($\Omega \cdot cm^2$) of each porous film was calculated by the following equation (3), wherein $R_0$ is an electric resistance ($\Omega$) of the electrolytic solution, $R_1$ is the electric resistance ($\Omega$) of each porous film measured in the state of immersing it in the electrolytic solution, and S is the cross-sectional area (cm$^2$) of each porous film.

$$R=(R_1-R_0)\times S \tag{3}$$

B. SD Initiation Temperature

Two edges of each porous film was fixed such that the length in the stretched direction became constant. The film was heated to a definite temperature for 15 minutes and then cooled to room temperature to obtain a sample. Many samples were prepared by changing the heating temperature, and the electric resistance thereof was measured at room temperature. Further, the relationship of the heating temperature and the electric resistance was shown in a graph, and from the graph, the temperature at which the electric resistance increased rapidly was read. The temperature was defined as the SD initiation temperature (°C.).

C. Vickers hardness

The Vickers hardness of the outer layer of each porous film was measured by a thin film hardness tester (MHA-400, manufactured by NEC Corporation). A diamond trigonal pyramid stylus (the vertically opposite angle 80°, the tip diameter 1 µm) was used as an indenter for measurement, and the Vickers hardness was measured under the conditions of a pressing speed of 21 mm/sec, and a pressing depth of 2 µm.

D. Percent defective

A porous film, a belt-form positive electrode (manganese dioxide was used as the main component of the active materials), a porous film, and a belt-form negative electrode (lithium) were superposed in this order, they were wound into a roll form, the roll-form assembly was inserted into a metal cylinder (with the closed bottom) having a inside diameter of 14 mm and a length of 50 mm, and an electrolytic solution (the same composition as used for the measurement of the initial electric resistance) was injected in the cylinder. The upper portion of the metal cylinder was closed to obtain a lithium battery (200 cells were assembled per each porous film). Voltage of 250V was applied to both electrodes of each cell, the cells wherein the electric resistance became lower than 10 MΩ was defined as the defective, the number of such cells was counted, and the percent defective (%) was calculated.

TABLE

| | Electric Resistance (Ω · cm²) | SD Initiation Temperature (°C.) | Vickers Hardness | Percent Defective (%) |
|---|---|---|---|---|
| Example 1 | 1.7 | 135 | 10 | 3 |
| Example 2 | 1.2 | 135 | 10 | 2 |
| Example 3 | 1.5 | 135 | 10 | 3 |
| Example 4 | 1.3 | 135 | 10 | 2 |
| Example 5 | 1.2 | 135 | 10 | 3 |
| Example 6 | 1.1 | 145 | 10 | 2 |
| Example 7 | 1.5 | 135 | 12 | 1 |
| Comparative Example 1 | 1.6 | 135 | 7 | 11 |
| Comparative Example 2 | 1.9 | 135 | 6 | 14 |
| Comparative Example 3 | 1.8 | 135 | 7 | 15 |

As described above, when the porous film of the present invention is used as a separator for a battery, there are advantages that the porous film is difficult to be scratched and perforated at assembling cells and the occurrence of the defective is less. Further, according to the production method of the present invention, the laminate porous film can easily be produced.

While the invention has been described in detail and with reference to specific embodiments thereof, it will be apparent to one skilled in the art that various changes and modifications can be made therein without departing from the spirit and scope thereof.

What is claimed is:

1. A porous film comprising a porous inner layer comprising a polyethylene as said inner layer's essential component, and having formed on both surfaces thereof a porous outer layer comprising a polypropylene, said outer layer having a Vickers hardness of from 10 to 20.

2. The porous film as claimed in claim 1, wherein the porous inner layer comprises a mixture of the polyethylene and other thermoplastic synthetic resin.

3. The porous film as claimed in claim 2, wherein the polyethylene is used in an amount of from 30 to 80% by weight based on the total weight of the polyethylene and the other thermoplastic synthetic resin.

4. The porous film as claimed in claim 2, wherein the other thermoplastic synthetic resin is a polypropylene.

5. The porous film as claimed in claim 1, wherein the porous film has a thickness of from about 10 to 100 µm.

6. The porous film as claimed in claim 1, wherein the porous film has a porosity of from about 20 to 80%.

7. The porous film as claimed in claim 1, wherein the porous film has micropores having a pore diameter of from about 0.02 to 2 µm.

8. A method of producing a porous film, which comprises forming a laminate film having an inner layer comprising a polyethylene as the essential component, and having formed on both surfaces thereof an outer layer comprising a polypropylene layer, stretching the laminate film to make porous the inner layer and the outer layers, and then heat-treating the porous laminate film to increase the Vickers hardness of the outer layers of from 10 to 20.

9. The method as claimed in claim 8, wherein prior to stretching, the laminate film is heat-treated at about 120° to 170° C. for about 2 seconds to 5 hours.

10. The method as claimed in claim 8, wherein the laminate film is stretched at low temperature and then stretched at high temperature.

11. The method as claimed in claim 10, wherein the low-temperature stretching is conducted at about −20° to 60° C.

12. The method as claimed in claim 10, wherein the high-temperature stretching is conducted at about 90° to 130° C.

13. The method as claimed in claim 8, wherein the heat treatment is conducted at about 60° to 120° C. for about 10 to 500 hours.

* * * * *